(12) United States Patent
Otani et al.

(10) Patent No.: US 9,420,370 B2
(45) Date of Patent: Aug. 16, 2016

(54) AUDIO PROCESSING DEVICE AND AUDIO PROCESSING METHOD

(71) Applicant: FUJITSU LIMITED, Kawasaki-shi, Kanagawa (JP)

(72) Inventors: Takeshi Otani, Kawasaki (JP); Taro Togawa, Kawasaki (JP); Masanao Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/822,119

(22) Filed: Aug. 10, 2015

(65) Prior Publication Data

US 2015/0350781 A1 Dec. 3, 2015

Related U.S. Application Data

(62) Division of application No. 13/707,928, filed on Dec. 7, 2012, now abandoned.

(30) Foreign Application Priority Data

Jan. 23, 2012 (JP) .................................. 2012-11084

(51) Int. Cl.
*H04R 3/00* (2006.01)
*H04B 3/20* (2006.01)
*G10L 21/0232* (2013.01)
*G10L 21/0208* (2013.01)

(52) U.S. Cl.
CPC ............ *H04R 3/002* (2013.01); *G10L 21/0232* (2013.01); *H04B 3/20* (2013.01); *G10L 2021/02082* (2013.01)

(58) Field of Classification Search
None
See application file for complete search history.

(56) References Cited

U.S. PATENT DOCUMENTS

| 2006/0115095 | A1 | 6/2006 | Glesbrecht et al. |
| 2008/0192957 | A1 | 8/2008 | Kubo |
| 2008/0292108 | A1* | 11/2008 | Buck .................... H04R 3/04 381/63 |
| 2010/0296662 | A1 | 11/2010 | Tanaka |

(Continued)

FOREIGN PATENT DOCUMENTS

| EP | 1667416 | 6/2006 |
| EP | 1956865 | 8/2008 |

(Continued)

OTHER PUBLICATIONS

Japanese Office Action mailed Jun. 30, 2015 for corresponding Japanese Patent Application No. 2012-011084, with Partial English Translation, 5 pages.

(Continued)

*Primary Examiner* — Brenda Bernardi
(74) *Attorney, Agent, or Firm* — Fujitsu Patent Center

(57) ABSTRACT

An audio processing device includes a reverb property estimating unit that estimates a reverb property at each frequency on the basis of a first audio signal and a second audio signal representing sounds of the first audio signal output by an audio output unit and collected by an audio input unit, a gain calculating unit that determines an attenuating ratio for a component of the first audio signal at each frequency such that the larger the reverb property at the frequency is, the larger the attenuating ratio for the component at the frequency becomes, and a correcting unit that attenuates the first audio signal at the each frequency in accordance with the attenuating ratio determined for each frequency.

12 Claims, 8 Drawing Sheets

(56) References Cited

U.S. PATENT DOCUMENTS

2012/0221329 A1    8/2012  Harsch
2013/0028432 A1*   1/2013  Suzuki .................... H04S 7/305
                                                        381/66
2013/0077798 A1*   3/2013  Otani .................. G10L 21/0208
                                                        381/66

FOREIGN PATENT DOCUMENTS

JP    2009-005274       1/2009
WO    2009/093416 A1    7/2009
WO    2010/000878       1/2010

OTHER PUBLICATIONS

European Extended Search Report dated Jul. 4, 2103 for corresponding European Patent Application No. 12196924.0 (7 pages).
Chinese Office Action mailed Feb. 28, 2015 for corresponding Chinese Patent Application No. 201210587249.8, with partial English translation (21 pages).
USPTO, (Bernardi) Restriction Requirement, Nov. 3, 2014, in parent U.S. Appl. No. 13/707,298 [pending].
USPTO, (Bernardi) Non-Final Rejection, Jan. 26, 2015, in parent U.S. Appl. No. 13/707,298 [pending].
USPTO, (Bernardi) Final Rejection, May 12, 2015, in parent U.S. Appl. No. 13/707,298 [pending].

* cited by examiner

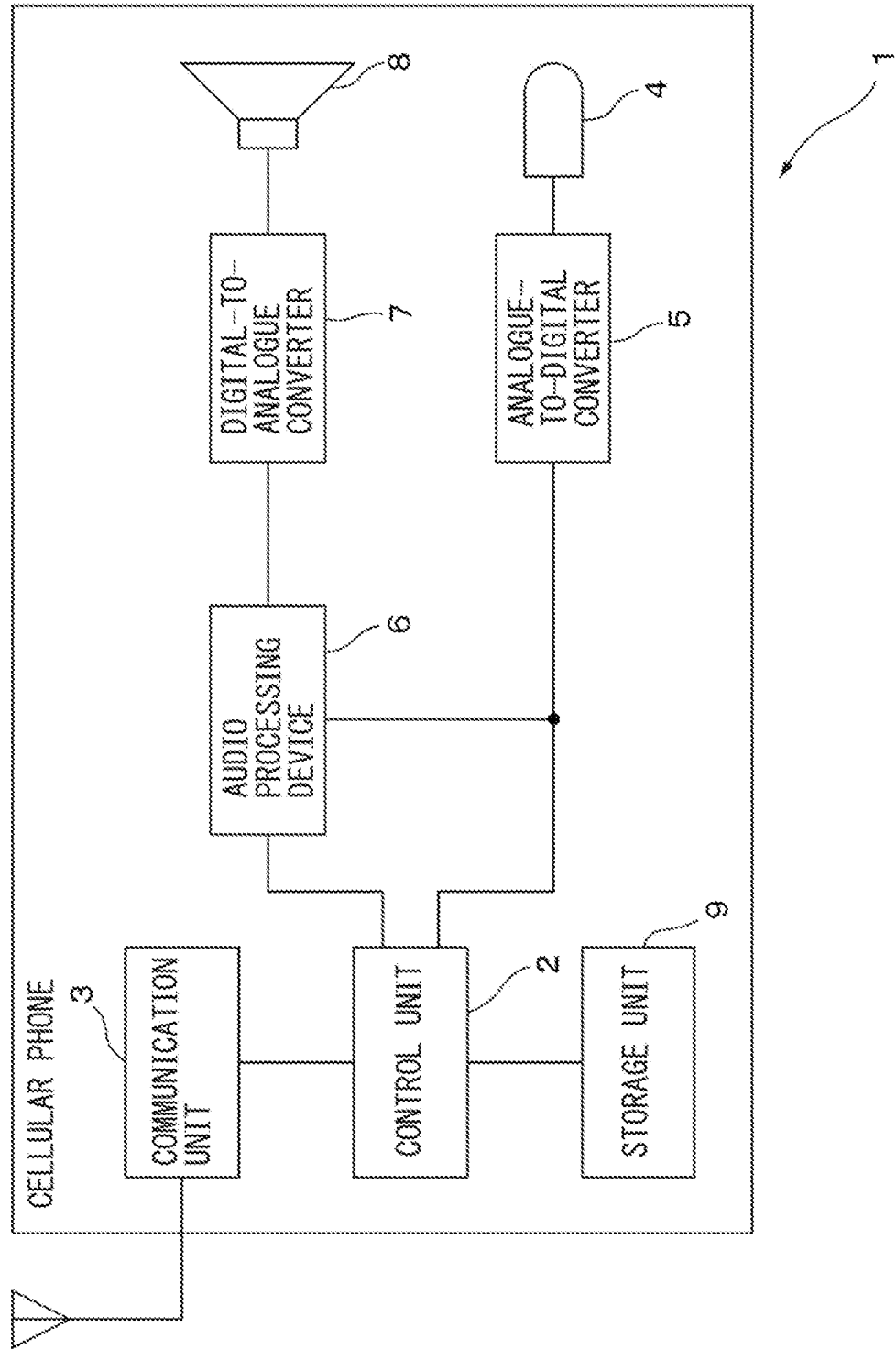

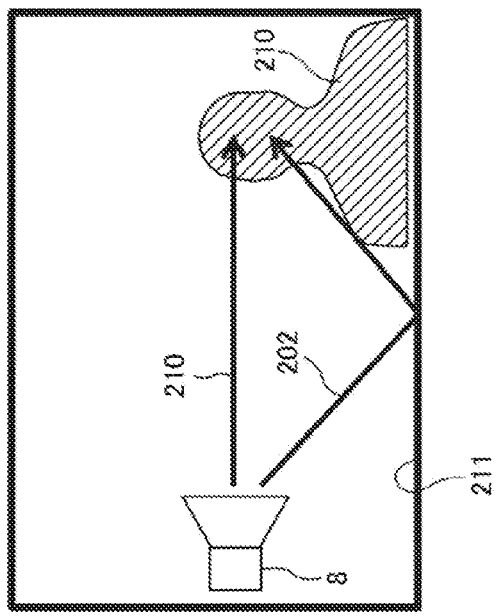
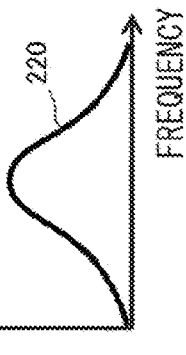
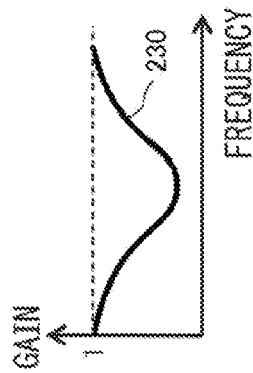
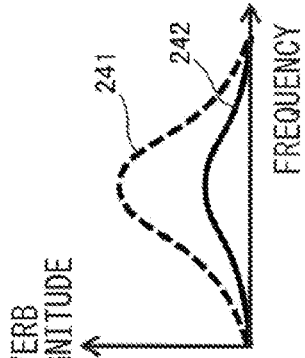

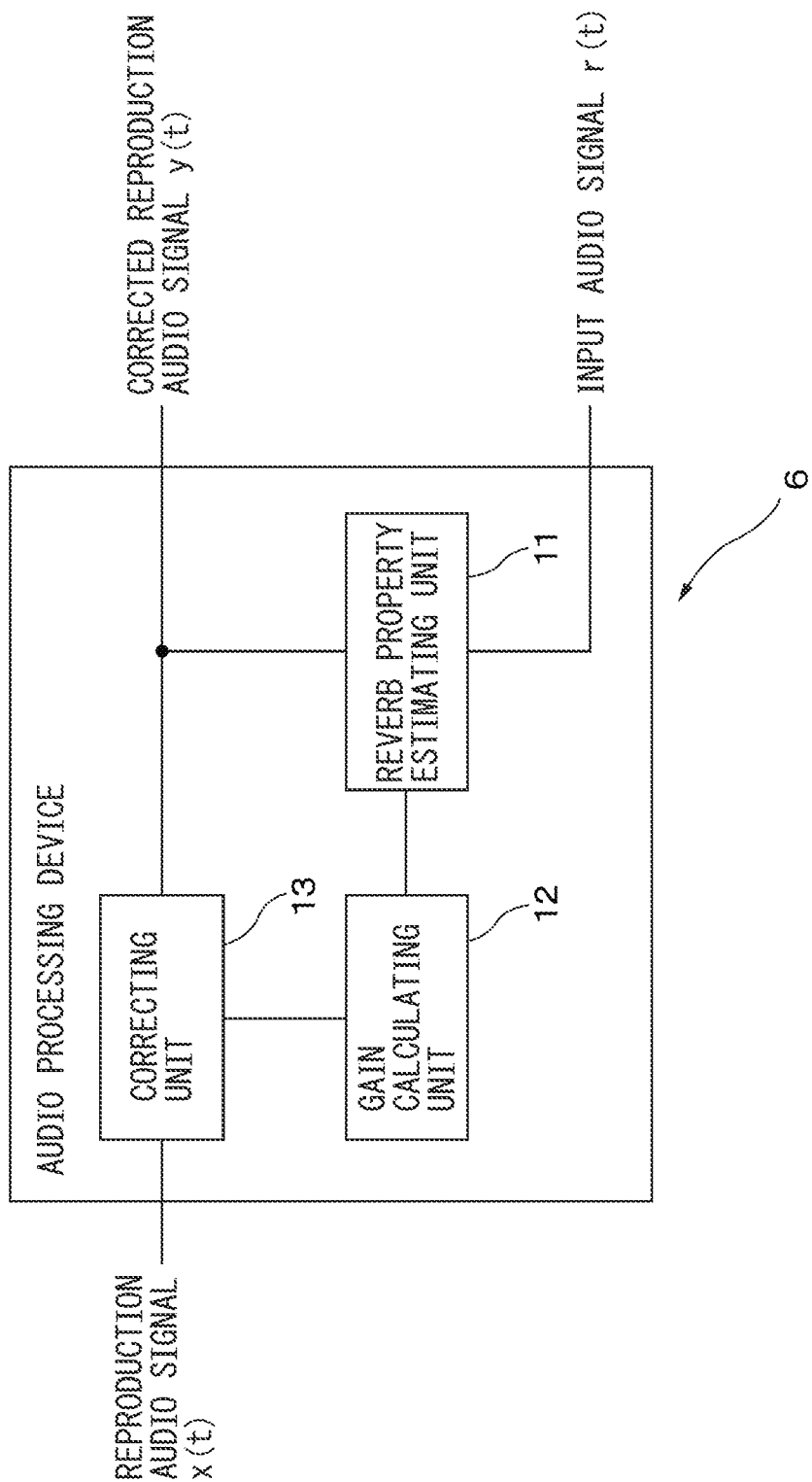

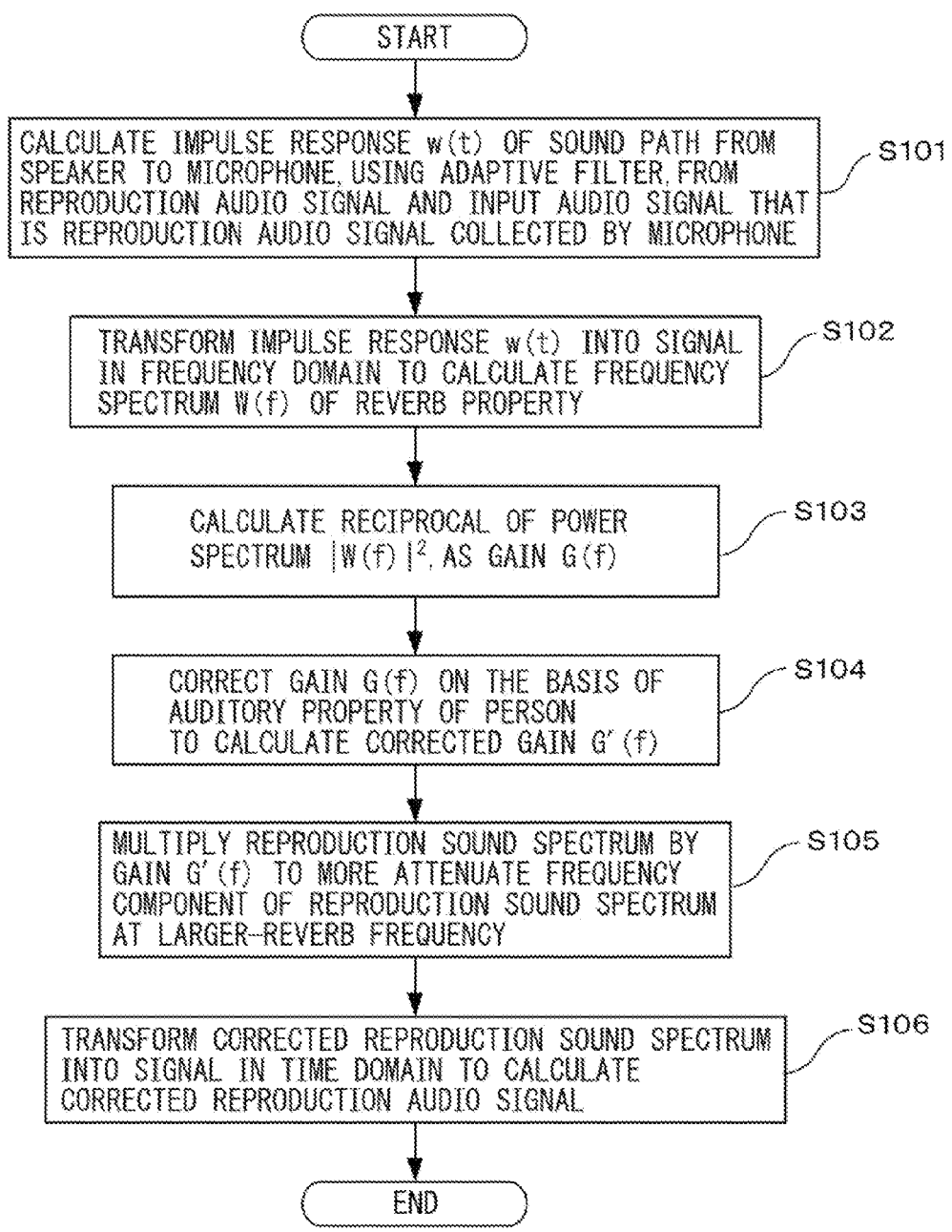

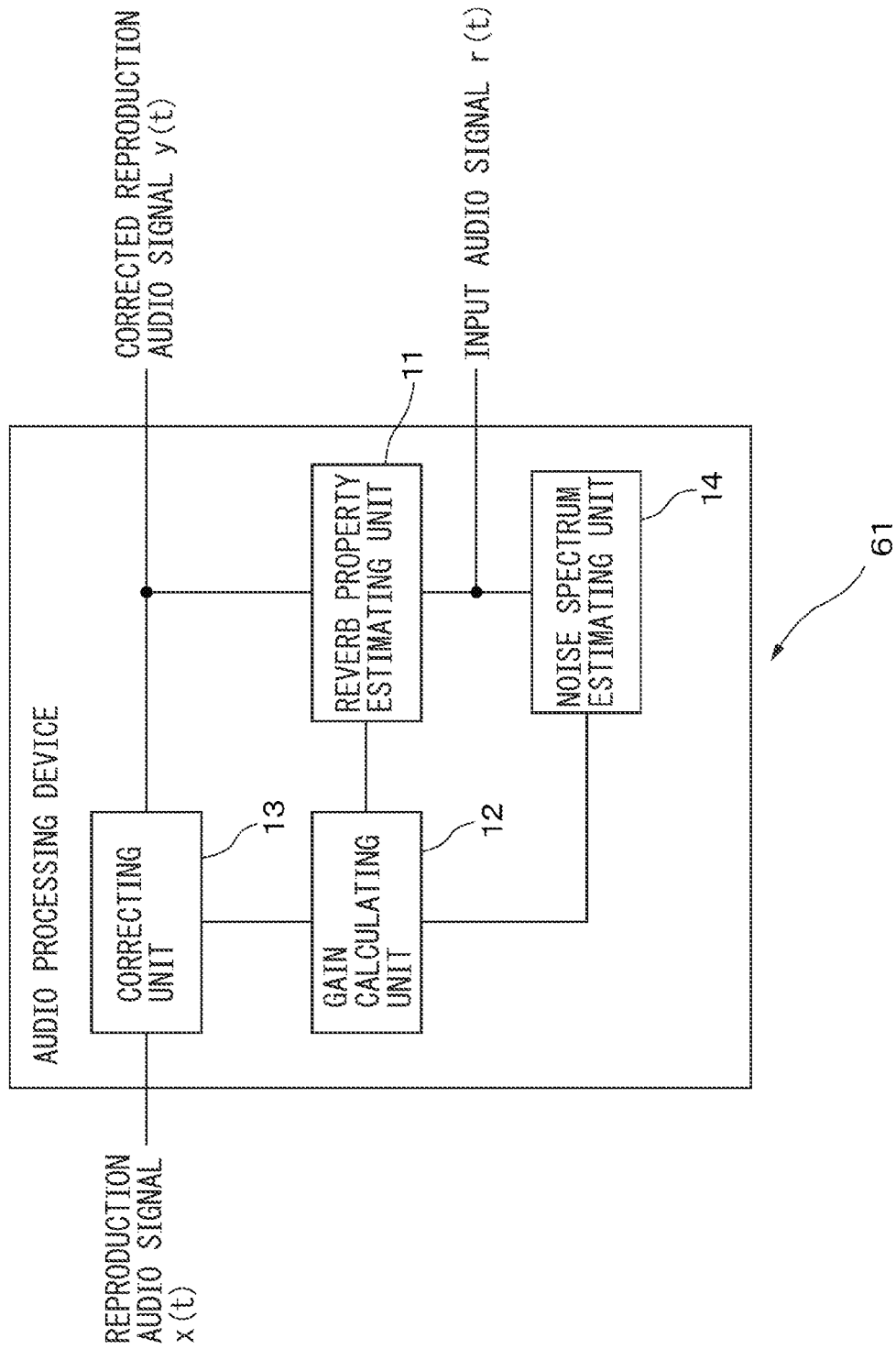

AUDIO PROCESSING DEVICE AND AUDIO PROCESSING METHOD

CROSS-REFERENCE TO RELATED APPLICATION

This application is a divisional of application Ser. No. 13/707,928, filed Dec. 7, 2012, which is based upon and claims the benefit of priority of prior Japanese Patent Application No. 2012-11084, filed on Jan. 23, 2012, the entire contents of which are incorporated herein by reference.

FIELD

The embodiments discussed herein are related to audio processing device and audio processing method that suppress a reverb caused by an audio signal that is output from a speaker.

BACKGROUND

Sound generation from a speaker arranged in a space surrounded by an object easily reflecting a sound that not only directly reaches a listener from the speaker, but also indirectly reaches a listener from the speaker after an object reflects sound at least once. Sound indirectly reaching a listener is referred to as a reverb sound. The timing that reverb sound reaches a listener is later than the timing that sound directly reaches a listener from a speaker. Accordingly, when reverb sound occurs, sound directly reaching a listener overlaps reverb sound to make it difficult for a listener to hear the overlapped sounds. Recently, a cellular phone having a waterproof function and hands-free function has been available. When such a cellular phone is used in a space such as a bathroom where reverb easily occurs, reverb sound may make it is difficult for a listener to hear a sound generated from cellular phone. For this reason, suppressing a reverb sound generated from a speaker has been researched (for example, refer to Japanese Laid-open Patent Publication No. 2009-5274).

For example, the acoustic device disclosed in Japanese Laid-open Patent Publication No. 2009-5274 uses a comb filter to filter a digital signal converted from an acoustic signal so as to attenuate or eliminate a frequency component from a particular frequency band.

However, reverb property varies depending on the environment around a speaker. Accordingly, a frequency band to which a comb filter gives attenuation effect sometimes does not match a frequency band in which reverb property is relatively large. When this occurs, even if a comb filter filters an audio signal to be output from a speaker, reverb is not efficiently suppressed. As a result, sound quality of a sound output from a speaker is not improved, and on the contrary, sound quality may be degraded.

SUMMARY

According to one embodiment, an audio processing device is provided. The audio processing device includes a reverb property estimating unit that estimates a reverb property at each frequency on the basis of a first audio signal and a second audio signal representing sounds of the first audio signal output by an audio output unit and collected by an audio input unit, a gain calculating unit that determines an attenuating ratio for a component of the first audio signal at each frequency such that the larger the reverb property at the frequency is, the larger the attenuating ratio for the component at the frequency becomes, and a correcting unit that attenuates the first audio signal at the each frequency in accordance with the attenuating ratio determined for each frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 schematically illustrates a configuration of a cellular phone provided with an audio processing device according to the first embodiment.

FIG. 2A is a schematic illustration representing a direct sound and a reverb sound that correspond to the reproduction audio signal output from the speaker.

FIG. 2B represents one example of a frequency spectrum of a reverb property estimated on the basis of sounds corrected by a microphone.

FIG. 2C represents one example of frequency spectrum of a gain for correcting the reproduction audio signal to be reproduced from the speaker.

FIG. 2D represents one example of the frequency property of the original reproduction audio signal, and the frequency property of the corrected reproduction audio signal.

FIG. 3 schematically illustrates a configuration of the audio processing device according to the first embodiment.

FIG. 4 is operational flowchart of audio processes according to the first embodiment.

FIG. 5 schematically illustrates a configuration of the audio processing device according to the second embodiment.

DESCRIPTION OF EMBODIMENTS

Figure 6:
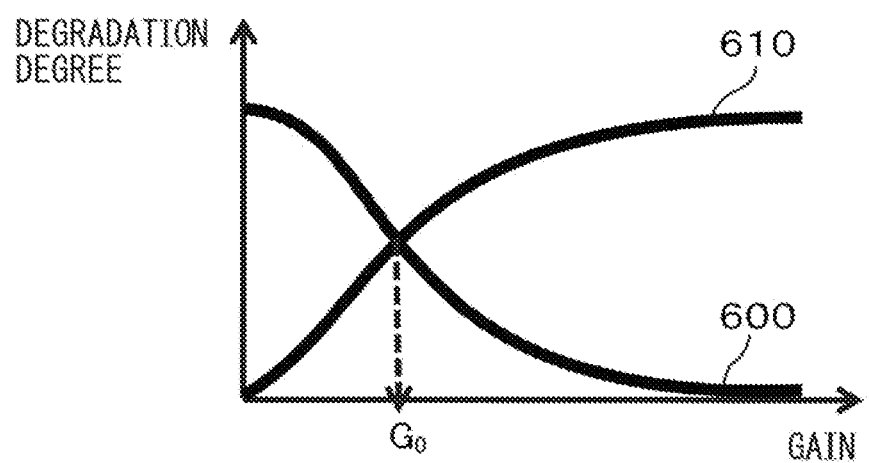
FIG. 6 schematically illustrates a relation between the gain and the degradation in quality of a reproduction audio signal.

In the following, an audio processing device according to various embodiments will be described with reference to the drawings.

On the basis of sounds that are reproduction sounds output from a speaker and that are collected by a microphone, the audio processing device obtains a reverb property around an audio reproducing apparatus provided with the audio processing device. The audio processing device attenuates a frequency component of a reproduction audio signal such that the larger reverb at the frequency is, the larger an attenuated amount at the frequency becomes. The acoustic processing device then outputs the attenuated reproduction audio signal from the speaker. The reverb is thereby suppressed.

FIG. 1 schematically illustrates a configuration of a cellular phone provided with an audio processing device according to a first embodiment. As illustrated in FIG. 1, the cellular phone 1 is one example of the audio processing device, and includes a control unit 2, a communication unit 3, a microphone 4, an analogue-to-digital converter 5, the audio processing device 6, a digital-to-analogue converter 7, a speaker 8, and a storage unit 9.

Among them, the control unit 2, the communication unit 3, and the audio processing unit 6 are configured as separate circuits, respectively. Alternatively, the circuits respectively corresponding to these elements constitute an integrated circuit that is provided with the cellular phone 1. Alternatively, each of these elements may be a functional module implemented by a computer program that is executed on a processor of the cellular phone 1.

The control unit 2 includes at least one processor, a nonvolatile memory, a volatile memory, and a peripheral circuit. The control unit 2 performs a call control process such as wireless connection and disconnection between the cellular phone 1 and the base station (not illustrated) in accordance with the communication standard followed by the cellular phone 1 when a telephone call is initiated by an operation via an operational unit (not illustrated) such as a keypad of the cellular phone 1. In accordance with a result of the call control process, the control unit 2 instructs the communication unit 3 to start or end audio telephone conversation or data communication. The control unit 2 extracts an encoded audio signal contained in a downlink signal received from the base station via the communication unit 3, and decodes the audio signal. When a hands-free function is used, i.e., when a user is away from the speaker 8, the control unit 2 outputs the decoded audio signal as a reproduction audio signal to the audio processing device 6. When the hands-free function is not used, the control unit 2 may output the decoded audio signal directly to the digital-to-analogue converter 7.

The control unit 2 encodes the audio signal input via the microphone 4, and generates an uplink signal containing the encoded input audio signal. The control unit 2 transfers the uplink signal to the communication unit 3. As an encoding method for the audio signal, for example, the Adaptive Multi-Rate-NarrowBand (AMR-NB) method standardized by the Third Generation Partnership Project (3GPP), or the Adaptive Multi-Rate-WideBand (AMR-WB) method may be used.

Alternatively, in accordance with an operation of a user via the operational unit, the control unit 2 may read out the encoded audio signal or video signal stored in the storage unit 9, and may decode the audio signal or video signal. The control unit 2 may output the decoded audio signal, or the decoded audio signal contained in the video signal, as the reproduction audio signal, to the audio processing device 6. When this occurs, as an encoding method for the audio signal, for example, the MPEG-4 Advanced Audio Coding (MPEG-4 AAC) or High-Efficiency AAC (HE-AAC) standardized by the Moving Picture Experts Group (MPEG) may be used.

The communication unit 3 performs wireless communication with the base station. The communication unit 3 receives a wireless signal, and converts the wireless signal into the downlink signal having a baseband frequency. The communication unit 3 performs receiving processes such as separation, demodulation and error correction decoding on the downlink signal, and then transfers the downlink signal to the control unit 2. The communication unit 3 performs transmitting processes such as error correction encoding, modulation and multiplexing on the uplink signal received from the control unit 2, and then superposes the uplink signal to a carrier wave having a wireless frequency to transmit the uplink signal to the base station.

The microphone 4 is one example of an audio input unit, and collects sounds around the cellular phone 1 to generate an analogue audio signal depending on magnitude of the sounds. The sounds collected by the microphone not only includes a direct sound that directly reaches the microphone 4 from a sound source, but also sometimes includes a reverb sound that indirectly reaches the microphone 4 from the sound source after being reflected by a surrounding wall or the like. The microphone 4 outputs the analogue audio signal to the analogue-to-digital converter 5. For example, when a user uses the hands-free function to talk over the telephone, the microphone 4 also collects the reproduced sound output from the speaker 8 and the reverb sound generated from the reproduced sound.

The analogue-to-digital converter 5 samples the analogue audio signal received from the microphone 4, at a predetermined sampling pitch to generate the digitized input audio signal. The analogue-to-digital converter 5 may include an amplifier, and may amplify the analogue audio signal to then digitize the amplified analogue audio signal.

The analogue-to-digital converter 5 outputs the input audio signal to the audio processing device 6 and the control unit 2.

The audio processing device 6 analyzes the input audio signal to estimate the reverb property around the cellular phone 1. In accordance with the estimated reverb property, the audio processing device 6 attenuates a frequency component of the reproduction audio signal such that the larger the reverb at the frequency is, the larger an attenuated amount at the frequency component becomes. Thereby, the reproduction audio signal is corrected. The audio processing device 6 outputs the corrected reproduction audio signal to the speaker 8 via the digital-to-analogue converter 7. The details of the audio processing device will be described later.

The digital-to-analogue converter 7 performs digital-to-analogue conversion on the reproduction audio signal received from the audio processing device 6 to generate the analogue reproduction audio signal. The digital-to-analogue converter 7 include an amplifier, and uses the amplifier to amplify the analogue reproduction audio signal. The digital-to-analogue converter 7 outputs the analogue reproduction audio signal to speaker 8.

The speaker 8 is one example of an audio output unit, and reproduces the reproduction audio signal received from the digital-to-analogue converter 7.

The storage unit 9 includes a nonvolatile semiconductor memory, for example to store various data used in the cellular phone 1. Examples of the various data are personal data, history information of mail and a telephone number of a user, or the audio signal or the video signal.

Next, the details of audio processing device 6 will be described.

FIG. 2A is a schematic illustration representing a direct sound and a reverb sound that correspond to the reproduction audio signal output from the speaker 8. In FIG. 2A, the arrow 201 represents the direct sound that directly reaches a user 210. The arrow 202 represents the reverb sound that has been output from the speaker 8, that has been reflected at least once by a wall surface 211 existing around the speaker 8, and that has reached the user 210. A path length of the reverb sound 202 is much longer than that of the direct sound 201. Accordingly, the direct sound 201 and reverb sound 202 reach the user 210 at the different timings, so that the reverb sound may make it difficult for the user 210 to hear the sound.

FIG. 2B represents one example of the frequency spectrum of the reverb property estimated on the basis of the sounds collected by the microphone. FIG. 2C represents one example of the frequency spectrum of a gain indicating a ratio of attenuating the reproduction audio signal to be reproduced from the speaker. In FIG. 2B, the horizontal axis indicates a frequency, and the vertical axis indicates the magnitude of the reverb. The graph 220 represents the frequency spectrum of the reverb property. In FIG. 2C, the horizontal axis indicates a frequency, and the vertical axis indicates the gain. The graph 230 represents the frequency spectrum of the gain. It is assumed that the larger the ratio of attenuating the reproduction audio signal is, the smaller the gain is. As illustrated in FIGS. 2B and 2C, the audio processing device 6 determines the gain at each frequency such that the larger the estimated reverb at the frequency is, the smaller the gain at the frequency becomes so as to more reduce the component at the larger-reverb frequency of the reproduction audio signal. For example, when the reverb takes the largest value at the frequency f0, the audio processing device 6 reduces the gain to be the smallest value at the frequency f0.

FIG. 2D represents one example of the frequency spectrum of the reverb sound generated by the original reproduction audio signal, and the frequency spectrum of the reverb generated by the corrected reproduction audio signal. In FIG. 2D, the horizontal axis indicates a frequency, and the vertical axis indicates magnitude of the reverb. The graph 241 represents the frequency spectrum of the reverb generated by the original reproduction audio signal. The graph 242 represents the frequency spectrum of the reverb generated by the reproduction audio signal that has been corrected by the gain of the graph 230. The larger the reverb at the frequency is, the more the component at the frequency of the reproduction audio signal is previously attenuated before the reproduction audio signal is output from the speaker 8. Thereby, the reverb caused by the reproduced sound from the speaker 8 can be suppressed as illustrated in FIG. 2D.

FIG. 3 schematically illustrates a configuration of the audio processing device 6 according to the first embodiment. The audio processing device 6 includes a reverb property estimating unit 11, a gain calculating unit 12, and a correcting unit 13.

The units provided with the audio processing unit 6 may be implemented as the separate circuits respectively in the audio processing device 6, or may be one integrated circuit that enables the functions of the respective units to be performed.

The reverb property estimating unit 11 obtains an impulse response in sound paths including a path from the speaker to the microphone 4, on the basis of the reproduction audio signal and on the basis of the input audio signal of the sounds that have been reproduced from the reproduction audio signal by the speaker 8 and that have been collected by the microphone 4. On the basis of the impulse response, the reverb property estimating unit 11 obtains a frequency spectrum of a reverb property around the cellular phone 1 for a sound output from the speaker 8.

According to the present embodiment, the reverb property estimating unit 11 uses an adaptive filter of a finite impulse response type to calculate the impulse response of the sound paths. When a coefficient of the adaptive filter representing the impulse response is updated by the least square method, the impulse response is calculated in accordance with the following equation.

$$w(t+1)=w(t)+2\cdot\mu\cdot e(t)\cdot y(t) \quad e(t)=r(t)-w(t)*y(t) \quad (1)$$

In the equation, y(t) designates the reproduction audio signal, and r(t) designates the input audio signal. In addition, e(t) designates an error signal. The coefficient μ is a convergence coefficient for determining an updating speed of the impulse response w(t), and is set to be 0.01 to 0.1, for example. The operator "*" designates convolution.

The reverb property estimating unit 11 transforms the impulse response w(t) into a signal in the frequency domain to obtain the frequency spectrum W(f) of the reverb property. The frequency spectrum W(t) designates a reverb property at each frequency. The reverb property estimating unit 11 may use the Fast Fourier Transform (FFT) or the Modified Discrete Cosine Transform (MDCT) as the time-to-frequency transform for transforming w(t) into the signal in the frequency domain.

After the reproduced sound output from the speaker 8 directly reaches the microphone 4, the reverb sound caused by the reproduced sound reaches the microphone 4. Accordingly, the w1(t) that is the time component included in the impulse response w(t) at and after the predetermined time t1 may be transformed into the signal in the frequency domain by the reverb property estimating unit 11. In this manner, the reverb property estimating unit 11 may calculate the frequency spectrum of the reverb property. The time t1 is set to be the time by which the reverb sound caused by the reproduced sound output from the speaker 8 reaches the microphone 4, and for example, is set to be 50 msec.

Each time the reverb property estimating unit 11 updates the impulse response w(t), the reverb property estimating unit 11 also updates the frequency spectrum W(f) of the reverb property. The reverb property estimating unit 11 outputs the frequency spectrum W(f) of the reverb property to the gain calculating unit 12.

The gain calculating unit 12 determines an attenuating ratio for the reproduction audio signal at each frequency such that the larger the reverb property at the frequency is, the larger the attenuating ratio at the frequency becomes. According to the present embodiment, the attenuating ratio of the reproduction audio signal for each frequency is represented by the gain by which the frequency spectrum of the reproduction audio signal is multiplied. Accordingly, the larger the attenuating ratio is, the smaller the gain becomes. Accordingly, on the basis of the frequency spectrum W(f) of the reverb property, the gain calculating unit 12 determines the gain at each frequency such that the larger the reverb at the frequency is, the smaller the gain at the frequency becomes.

For example, the gain calculating unit 12 calculates the gain in accordance with the following equation.

$$G(f) = \frac{1}{|W(f)|^2} \quad (2)$$

In the equation, f designates a frequency, and G(f) designates the gain determined for each frequency. In addition, |W(f)|² designates the power spectrum of the reverb.

The gain calculating unit 12 may correct the gain G(f) by the following equation for example, to be suitable for an auditory property of a person.

$$G'(f)=G(f)-A(f) \quad (3)$$

In the equation, A(f) designates the A property of the auditory property of a person, and G'(f) designates the gain corrected on the basis of the A property.

The gain calculating unit 13 outputs the corrected gain G'(f) to the correcting unit 13.

The correcting unit 13 attenuates the reproduction audio signal on the basis of the attenuating ratio determined for each frequency, before the reproduction audio signal is output to the speaker 8. According to the present embodiment, the larger the reverb at the frequency is, the more the correcting unit 13 attenuates the component of the reproduction audio signal at the larger-reverb frequency on the basis of the gain G'(t) received from the gain calculating unit 12.

For this purpose, for each frame having a predetermined length, the correcting unit 13 transforms the reproduction audio signal received from the control unit 2 into the reproduction sound spectrum in the frequency domain. The length of the frame is 10 msec to 100 msec, for example. The correcting unit 13 may use the FFT or the MDCT for example, for calculating the reproduction sound spectrum.

Next, the correcting unit 13 multiplies the reproduction sound spectrum by the gain G'(t) to correct the reproduction sound spectrum as represented by the following equation.

$$Y(n,f) = G'(f) \cdot X(n,f) \qquad (4)$$

In this equation, X(n, f) designates the reproduction sound spectrum for the frame of the number n, and Y(n, f) designates the corrected reproduction sound spectrum. As apparent from the equation (4), the smaller the gain G'(f) is, the smaller the corrected reproduction sound spectrum Y(n, f) becomes. The larger the power spectrum of the reverb is, the smaller the gain G'(f) becomes. As a result, the larger the reverb at the frequency is, the more the component of the reproduction audio signal at the frequency is attenuated.

The correcting unit 13 convert, by using the invert transform of the time-to-frequency transform used for calculating the reproduction sound spectrum, the corrected reproduction sound spectrum Y(n, f) into the signal in the time domain to obtain the corrected reproduction audio signal. The correcting unit 13 outputs the corrected reproduced sound signal to the speaker 8 via the digital-to-analogue converter 7 of the cellular phone 1.

FIG. 4 is an operational flowchart of the audio processes performed by the audio processing unit 6. On the basis of the reproduction audio signal, and on the basis of the input audio signal of the sounds that have been reproduced from the reproduction audio signal by the speaker 8 and that have been collected by the microphone 4, the reverb property estimating unit 11 obtains the impulse response w(t) of the sound paths from the speaker 8 to the microphone 4 by using the adaptive filter (step S101). The reverb property estimating unit 11 transforms the impulse response w(t) into the signal in the frequency domain to calculate the frequency spectrum W(f) of the reverb property (step S102). The reverb property estimating unit 11 outputs the frequency spectrum W(f) of the reverb property to the gain calculating unit 12.

The gain calculating unit 12 calculates the reciprocal of the power spectrum $|W(f)|^2$ of the reverb, as the gain G(f) (step S103). The gain calculating unit 12 corrects the gain G(f) in accordance with the auditory property of a person to calculate the corrected gain G'(f) (step S104). The gain calculating unit 12 outputs the corrected gain G'(f) to the correcting unit 13.

The correcting unit 13 transforms the reproduction audio signal into the signal in the frequency domain to obtain the reproduction sound spectrum. The correcting unit 13 multiplies the reproduction sound spectrum by the gain G'(t) so that the larger the reverb at the frequency is, the more the component of the reproduction audio signal at the frequency can be attenuated (step S105). The correcting unit 13 transforms the corrected reproduction sound spectrum into the signal in the time domain to calculate the corrected reproduction audio signal (step S106). The audio processing device 6 outputs the reproduction audio signal to the speaker 8 via the digital-to-analogue converter 7 to end the audio signal processes.

As described above, on the basis of the sounds that have been output from the speaker and that have been collected by the microphone, the audio processing device estimates the reverb property around the speaker. The larger the estimated reverb property is, the more the audio processing device attenuates the component of the reproduction audio signal at the frequency. Accordingly, the audio processing device can appropriately suppress the reverb sound generated from the reproduced sound output by the speaker regardless of an environment around the speaker.

Next, an audio processing device according to the second embodiment will be described. The audio processing device according to the second embodiment corrects the gain in accordance with a result of comparison between power of a noise and power of the reverb sound around the audio processing device, and in accordance with a result of the comparison between a reverb amount and a deformed amount. The following is described on the assumption that the audio processing device according to the second embodiment is provided in the cellular phone 1 illustrated in FIG. 1.

FIG. 5 schematically illustrates a configuration of the audio processing device 61 according to the second embodiment. The audio processing device 61 includes a reverb property estimating unit 11, a gain calculating unit 12, a correcting unit 13, and a noise spectrum estimating unit 14.

In the same manner as in the first embodiment, the reverb property estimating unit 11 obtains the reverb property at each frequency around the cellular phone 1 on the basis of the reproduction audio signal and the input audio signal of the sounds that have been reproduced from the reproduction audio signal by the speaker 8 and that have been collected by the microphone 4. Differently from the first embodiment, according to the present embodiment, the reverb property estimating unit 11 transforms the reproduction audio signal and the input audio signal into the signals in the frequency domain, and then calculates a transfer function representing the reverb property. In accordance with the transfer function, the reverb property estimating unit 11 obtains a spectrum of the reverb sound caused by the sounds reproduced by the speaker 8.

The reverb property estimating unit 11 uses the FFT or the MDCT for example to convert the reproduction audio signal and the input audio signal into the signals respectively in the frequency domain, for each frame having a predetermined length. The length of the frame is set to be 10 msec to 100 msec for example. The reverb property estimating unit 11 uses an adaptive filter of a finite impulse response type to calculate the transfer function. When a coefficient of the adaptive filter representing the transfer function is updated by the least square method, the transfer function is calculated by the following equation.

$$W(n+1, f) = W(n, f) + 2 \cdot \mu \cdot \sum_{d=D1}^{D2} (E(d, f) \cdot Y(n-d, f)) \qquad (5)$$

$$E(n, f) = R(n, f) - \sum_{d=D1}^{D2} (W(d, f) \cdot Y(n-d, f))$$

In the equation, Y(n, f) represents the frequency spectrum of the reproduction audio signal in the frame n, and R(n, f) represents the frequency spectrum of the input audio signal in the frame n. In addition, W(n, f) represents the transfer function calculated for the frame n. Further, E(n, f) represents the frequency spectrum of the error signal in the frame n. The coefficient μ represents a convergence coefficient for determining the updating speed of the transfer function, and set to 0.01 to 0.1 for example. Further, D1 and D2 represent the first frame and the last frame in the period used in the convolution calculation, respectively.

The reverb property estimating unit 11 performs weighted addition on the frequency spectrum of the reproduction audio signal with the transfer function of the reverb property by the following equation to estimate the reverb spectrum representing the frequency spectrum of the reverb sound.

$$Rv(n, f) = \sum_{m=0}^{M-1} W(m, f) \cdot Y(n-m, f) \quad (6)$$

In the equation, Rv(n, f) represents the reverb spectrum in the frame n. The reverb property estimating unit 11 outputs the transfer function W(n, f) of the reverb and the reverb spectrum Rv(n, f) for each frame to the gain calculating unit 12.

The noise spectrum estimating unit 14 estimates a noise spectrum around the cellular phone provided with the audio processing device 61. According to the present embodiment, the noise spectrum estimating unit 14 estimates a stationary noise model on the basis of the input audio signal to estimate the spectrum of a noise contained in the input audio signal.

Generally, a length from the microphone 4 to a noise source is larger than a length from the microphone 4 to the speaker 8. Accordingly, power of a noise is smaller than power of the reproduced sound output from the speaker 8. In view of it, in order to estimate the spectrum of a noise, the noise spectrum estimating unit 14 calculates an average value of power in each of frequency bands for the frame, the frame having a small power spectrum of the input audio signal input by the audio processing device 61.

Specifically, on the basis of the frequency spectrum of the input audio signal obtained by transforming the input audio signal in each frame into the signal in the frequency domain, the noise spectrum estimating unit 14 calculates the average value p of the power spectrum by the following equation.

$$p = \frac{1}{F} \sum_f (R(n, f)^2) \quad (7)$$

In the equation, F designates the total number of the frequency bands. In addition, R(n, f) designates the frequency spectrum of the input audio signal in the frame n.

Next, the noise spectrum estimating unit 14 compares the average value p of the power spectrum of the latest frame with a threshold value Thr corresponding to the upper limit of the power of a noise component. When the average value p is smaller than the threshold value Thr, the noise spectrum estimating unit 14 averaged the power spectrum in the time direction for each frequency band by the following equation to calculate the estimated noise spectrum for the latest frame.

$$N(n+1,f) = \alpha \cdot R(n,f) + (1-\alpha) \cdot N(n,f) \quad (8)$$

In the equation, N(n+1, f) and N(n, f) designate the estimated noise spectra in the frames (n+1) and n, respectively. When the equation (8) is calculated, the N(n, f) is read from a buffer provided in the noise spectrum estimating unit 14, for example. The coefficient α is a forgetting factor, and is set to be any value within the range of 0.01 to 0.1, for example. Meanwhile, when the average value p is larger than the threshold value Thr, the noise spectrum estimating unit 14 does not update the estimated noise spectrum since it is estimated that the latest frame contains a component other than a noise. In other words, N(n+1, f) is made equal to N(n, f).

Instead of calculating the average value p of the power spectrum, the noise spectrum estimating unit 14 may obtain the maximum value of the power spectra of the all frequency bands, and compare the maximum value with the threshold value Thr.

In particular, when a noise contained in the input audio signal is white noise, there is no correlation between the power spectra of the frames. Therefore, the noise spectrum estimating unit 14 may update the estimated noise power spectrum, only when correlation values between the latest frame and the frame immediately before the latest frame over the power spectra of the all frequency bands are smaller than a predetermined threshold. The predetermined threshold may be 0.1 for example.

The noise spectrum estimating unit 14 outputs the noise spectrum estimated for each frame to the gain calculating unit 12, and stores the estimated noise spectrum in the buffer provided in the noise spectrum estimating unit 14.

In the same manner as in the first embodiment, the gain calculating unit 12 calculates the gain for each frequency such that the larger the reverb at the frequency is, the more the component of the reproduction audio signal at the frequency is attenuated. According to the present embodiment, the gain calculating unit 12 calculates the gain by the following equation such that the larger the spectrum of the reverb property is, the smaller the gain at the frequency becomes.

$$G(n, f) = 1 \bigg/ \left\{ \frac{1}{M} \sum_{m=0}^{M-1} W(n-m, f) \right\} \quad (9)$$

In the equation, G(n, f) designates the gain for the frequency f in the frame n. In addition, M designates the number of the frames used in calculating the average value of the frequency spectrum of the reverb property, and is set to be 10 to 20 for example.

In the equation, the smaller the gain is, the larger the deformed amount of the reproduced sound becomes, the deformed amount being generated by multiplying the reproduction audio signal by the gain. For this reason, the sound quality of the reproduction audio signal is degraded due to the deformed amount.

FIG. 6 schematically illustrates a relation between the gain and the degradation in the sound quality. In FIG. 6, the horizontal axis indicates the gain, and the vertical axis indicates a degree of the degradation in the sound quality. The graph 600 represents the relation between the gain and the degree of the degradation in the sound quality of the reproduction audio signal, the degradation being caused by the deformed amount that is generated by multiplying the reproduction audio signal by the gain. Meanwhile, the graph 610 represents the relation between the gain and the degree of the degradation in the sound quality of the reproduction audio signal, the degradation being caused by the reverb that is suppressed by multiplying the reproduction audio signal by the gain. As expressed by the graph 600, the larger the gain is, i.e., the smaller the attenuating ratio by which the reproduction audio signal is multiplied is, the smaller the deformed amount becomes, reducing the degree of the degradation in the sound quality caused by the deformed amount. Meanwhile, as expressed by the graph 610, the larger the gain is, the less the reverb is suppressed, increasing the degree of the degradation in the sound quality caused by the reverb. In view of it, for example, the gain G0 corresponding to the intersection of the graphs 600 and 610 is used to balance the sound degradation caused by the deformed amount, with the sound degradation caused by the reverb.

For such a balance, according to the present embodiment, when the deformed amount of the reproduction sound exceeds, by an exceeding amount, the reverb amount representing a ratio of the magnitude of the reverb sound to the reproduction audio signal, the gain calculating unit 12 corrects the gain such that the larger the exceeding amount is, the smaller the attenuating ratio of the reproduction audio signal becomes. Thereby, the sum of the degradation degree caused by the deformed amount and the degradation degree caused by the reverb amount can be reduced.

For the purpose of it, by the following equation, the gain calculating unit 12 calculates a rate of the sum of the spectra of the reverb sound to the sum of the spectra of the reproduction audio signal for each of the predetermined number of the current frame and the frames immediately before the current frame n, and sums up the calculated rates to calculate the reverb amount for the frame n.

$$RR(n) = \sum_{m=0}^{L-1} \left( \frac{\sum_f Rv(n-m, f)}{\sum_f Y(n-m, f)} \right) \quad (10)$$

Where RR(n) designates the reverb amount for the frame n, L designates the number of the frames used for calculating the reverb amount, and set to be 10 to 20 for example.

Further, by the following equation, the gain calculating unit 12 sums up the differences between 1 and the gain, the difference being calculated for each frequency, the differences being calculated for each of the predetermined number of the current frame and frames immediately before the current frame. In this manner, the gain calculating unit 12 calculates the sum of the differences, as the deformed amount for the frame n.

$$D(n) = \sum_{m=0}^{L-1} \left( \sum_f (1 - G(n-m, f)) \right) \quad (11)$$

Where D(n) designates the deformed amount in the frame n, L designates the number of the frames used for calculating the deformed amount, and is preferably equal to the number of the frames used for calculating the reverb amount.

When the deformed amount is larger than the reverb amount, it is estimated that the deformation of the reproduction audio caused by multiplying the reproduction audio signal by the gain more affects the degradation in the reproduction audio than the reverb does. On the contrary, when the reverb amount is larger than the deformed amount, it is estimated that the reverb more affects the degradation in the reproduction audio than the deformation of the reproduction audio caused by multiplying the reproduction audio signal by the gain does. Accordingly, the larger the rate (RR(n)/D(n)) of the reverb amount to the deformed amount is, the more the gain calculating unit 12 reduces the gain to more attenuate the reproduction audio signal to more suppress the reverb. On the contrary, the smaller the rate of the reverb amount to the deformed amount is, the more the gain calculating unit 12 increases the gain to less attenuate the reproduction audio signal. For example, the gain calculating unit 12 corrects the gain by the following equation.

$$G'(n, f) = G(n, f) \frac{D(n)}{RR(n)} \quad (12)$$

In the equation, G(n, f) designates the gain for the frequency f in the frame n before being corrected, and G'(n, f) designates the gain for the frequency f in the frame n after being corrected.

The larger the volume of a noise around the cellular phone 1 provided with the audio processing device 61 is, the more it becomes difficult for a person to hear the reverb sound. When a person does not hear the reverb, suppressing the reverb scarcely improves the sound quality of the reproduced sound, and reversely degrades the sound quality of the reproduced sound by the amount of the deformation of the reproduced sound, the deformation being caused by suppressing the reverb. For this reason, the gain calculating unit 12 corrects the gain such that the larger the spectrum of the noise is, the smaller the attenuated amount of the reproduction audio signal is. The gain correcting unit 12 corrects the gain by the following equation for example.

$$G''(n, f) = G'(n, f) \frac{N(n, f)}{Y(n-1, f)} \quad (13)$$

Where G"(n, f) designates the gain for the frequency f in the frame n, the gain having been corrected on the basis of the spectrum of the noise.

The gain calculating unit 12 outputs the corrected gain G"(n, f) to the correcting unit 13.

The correcting unit 13 performs the same process as that performed by the correcting unit 13 of the first embodiment to correct the reproduction audio signal. In the present embodiment, the correcting unit 13 multiplies the spectrum X(n, f) of the reproduction audio signal by the gain G"(n, f) instead of G'(n, f), in the calculation of the equation (4).

Figure 7:
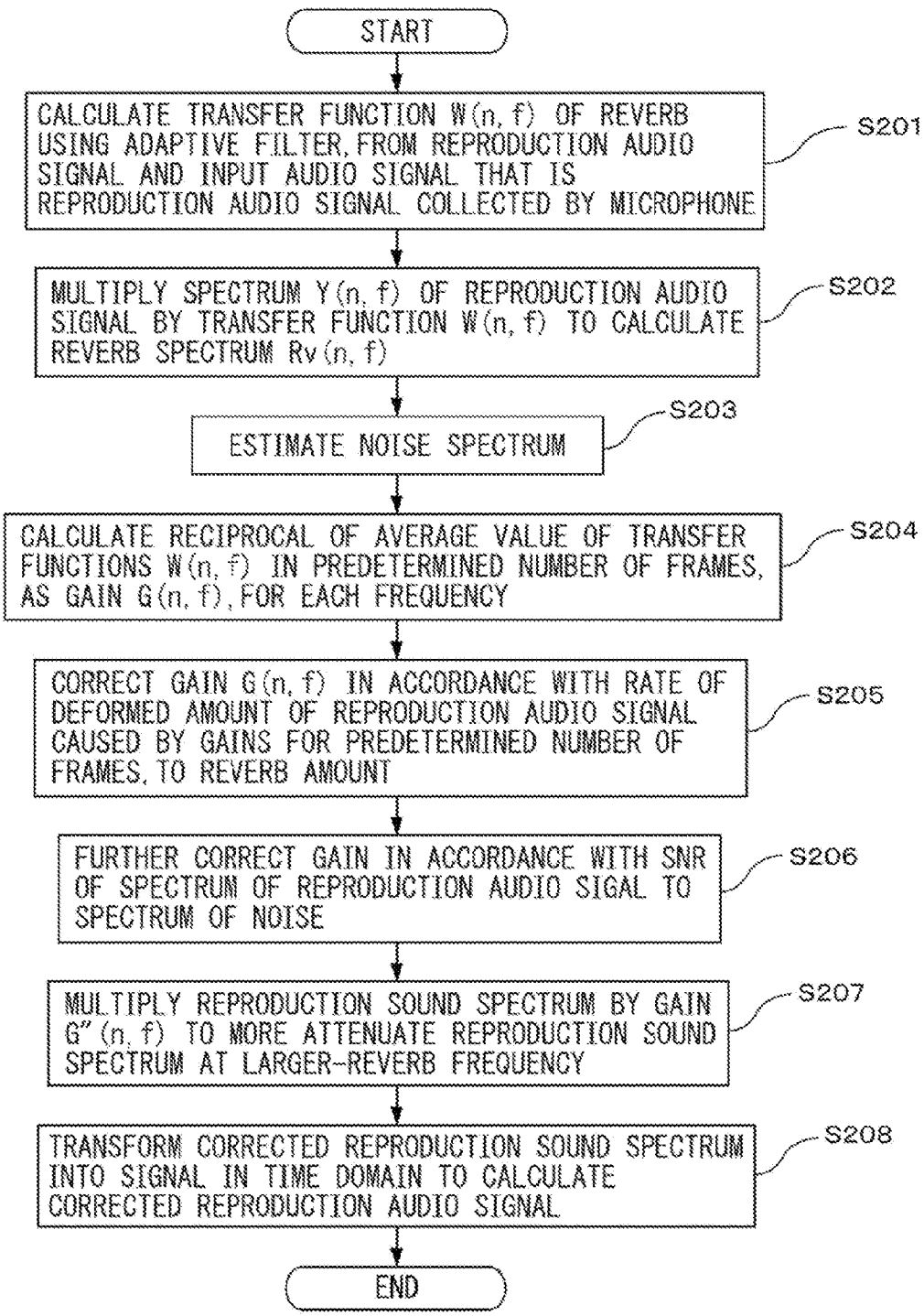
FIG. 7 is an operational flowchart of audio processes according to the second embodiment.

FIG. 7 is an operational flowchart of the audio processes performed by the audio processing device 61 according to the present embodiment.

The reverb property estimating unit 11 calculates the transfer function W(n, f) of the adaptive filter on the basis of the reproduction audio signal and the input audio signal of the sounds that have been reproduced from the reproduction audio signal by the speaker 8 and that have been collected by the microphone 4 (step S201). The reverb property estimating unit 11 multiplies the spectrum Y(n, f) of the reproduction audio signal by the transfer function W(n, f) to calculate the reverb spectrum Rv(n, f)(step S202). The reverb property estimating unit 11 outputs the transfer function W(n, f) and the reverb spectrum Rv(n, f) for each frame to the gain calculating unit 12.

The noise spectrum estimating unit 14 estimates the spectrum of the noise for each frame on the basis of the input audio signal (step S203). The noise spectrum estimating unit 14 outputs the spectrum of the noise for each frame to the gain calculating unit 12.

The gain calculating unit 12 calculates, as the gain G(n, f), the reciprocal of the average value of the predetermined number of the transfer functions W(n, f), for each frequency (step S204). The gain calculating unit 12 corrects the gain G(n, f) on the basis of the rate of the deformed amount of the reproduction audio signal to the reverb amount, the deformed amount being caused by the gain for the predetermined number of the current frame and the frames immediately before the current frame (step S205). In accordance with an SNR (signal-to-noise ratio) of the spectrum of the reproduction audio signal to the spectrum of the noise, the gain calculating unit 12 further corrects the gain that has been corrected on the basis of the rate of the deformed amount to the reverb amount (step S206). The gain calculating unit 12 outputs the corrected gain G"(n, f) to the correcting unit 13.

The correcting unit 13 transforms the reproduction audio signal into the signal in the frequency domain to obtain the reproduction sound spectrum, and multiplies the reproduction sound spectrum by the gain G"(n, f) so that the larger the estimated reverb at the frequency is, the more the frequency component of the reproduction sound spectrum can be attenuated (step S207). The correcting unit 13 transforms the corrected reproduction sound spectrum into the signal in the time domain to generate the corrected reproduction audio signal (step S208). The audio processing device 61 outputs the corrected reproduction audio signal to the speaker 8 via the digital-to-analogue converter 7 to terminate the audio signal processes. With the order of the steps S205 and S206 being reversed, the audio processing device 61 may perform the process of the step S206 and then perform the process of the step S205.

As described above, the audio processing device according to the second embodiment corrects the gain in accordance with the rate of the deformed amount of the reproduced sound to the reverb amount. Accordingly, the audio processing device can correct the reproduction audio signal so as to reduce the sum of the degradation in the reproduction audio signal caused by the reverb sound and the degradation in the reproduction audio signal caused by the deformation that is generated by a multiplication of the gain. The audio processing device can also suppress the degradation in the reproduction audio while suppressing the reverb since the audio processing device reduces the attenuated amount of the reproduction audio signal for the frequency at which a large noise makes it difficult for a person to hear the reverb sound.

According to a modified example, the gain calculating unit 12 may attenuate the reproduction audio signal only for the frequencies at which the SNR of the spectrum of the reproduction audio signal to the spectrum of the noise is larger than a predetermined threshold, and does not need to attenuate the reproduction audio signal for the other frequencies. For implementing such attenuation, the gain is determined by the following equation for example.

$$G''(n, f) = \begin{cases} G'(n, f) & \text{if } (SNR(n, f) > Th_{SNR}) \\ 1 & \text{else} \end{cases} \quad (14)$$

$$SNR(n, f) = \frac{Y(n-1, f)}{N(n, f)}$$

In the equation, $Th_{SNR}$ designates a threshold, and is set to be 1 to 1.2 for example.

According to another modified example, the gain calculating unit 12 may correct the gain only on the basis of the rate of the deformed amount to the reverb amount. When performing such correction, the gain calculating unit 12 outputs, to the correcting unit 13, the gain G'(n, f) calculated by the equation (12).

According to still another modified example, the gain calculating unit 12 may correct the gain only on the basis of the SNR of the spectrum of the reproduction audio signal to the noise spectrum without using the rate of the deformed amount to the reverb amount. When performing such correction, the gain calculating unit 12 may use the equation (13) or (14) at the right side of which the G'(n, f) is replaced with the G(n, f) that is calculated by the equation (9) to calculate the gain G"(n, f), and may output the G"(n, f) to the correcting unit 13.

According to yet another modified example, the gain calculating unit 12 may correct the gain so as to reduce the difference between the degree of the degradation in the sound quality of the reproduction audio signal caused by the reverb amount RR(n) and the degree of the degradation in the sound quality of the reproduction audio signal caused by the deformed amount D(n). When performing such correction, the gain calculating unit 12 may estimate the degree Degsd of the degradation in the sound quality of the reproduction audio signal caused by the deformed amount D(n), in accordance with a predetermined related equation. Similarly, the gain calculating unit 12 may estimate the degree Degrev of the degradation in the sound quality of the reproduction audio signal caused by the reverb amount RR(n), in accordance with a predetermined related equation. Parameters that represent these related equations, or a reference table that represents the relation between the deformed amount D(n) and the degree Degsd of the degradation in the sound quality and a reference table that represents the relation between the reverb amount RR(n) and the degree Degrev of the degradation in the sound quality may be stored, for example, in a nonvolatile semiconductor memory provided in the gain calculating unit 12. The gain calculating unit 12 refers to the reference tables to obtain the sound quality degradation Degsd and Degrev respectively corresponding to the deformed amount D(n) and the reverb amount RR(n).

For example, the degree of the sound quality degradation may be determined by comparing the sound quality corresponding to each deformed amount and the sound quality corresponding to each reverb amount, each sound quality being obtained on the basis of a means of subjectively or objectively evaluating the sound quality. For example, the means of objectively evaluating the sound quality includes the perceptual evaluation of speech quality (PESQ) or the perceived evaluation of audio quality (PEAQ) standardized by the International Telecommunication Union Telecommunication Standardization Sector (ITU-T).

In the present modified example, the gain calculating unit 12 may correct the gain by the following equation instead of the equation (12).

$$G'(n, f) = \begin{cases} G(n, f) \times 1.1 & \text{if } (Degrev/Degsd > Th_{deg}) \\ G(n, f) \times 0.9 & \text{else if } (Degsd/Degreg > Th_{deg}) \\ G(n, f) & \text{else} \end{cases} \quad (15)$$

In the equation, Thdeg designates a threshold, and is set to be 1.4 to 1.6 for example.

The audio processing device according to each embodiment or each modified example described above may be provided in various audio reproducing devices such as various types of audio devices or a personal computer that can be connected to a microphone and a speaker.

Each function of each unit of the audio processing device according to each embodiment or each modified example described above may be implemented by a computer program, and the computer program may be stored in a computer-readable medium such as a magnetic recording medium or optical recording medium. The computer-readable medium does not include a carrier wave.

Figure 8:
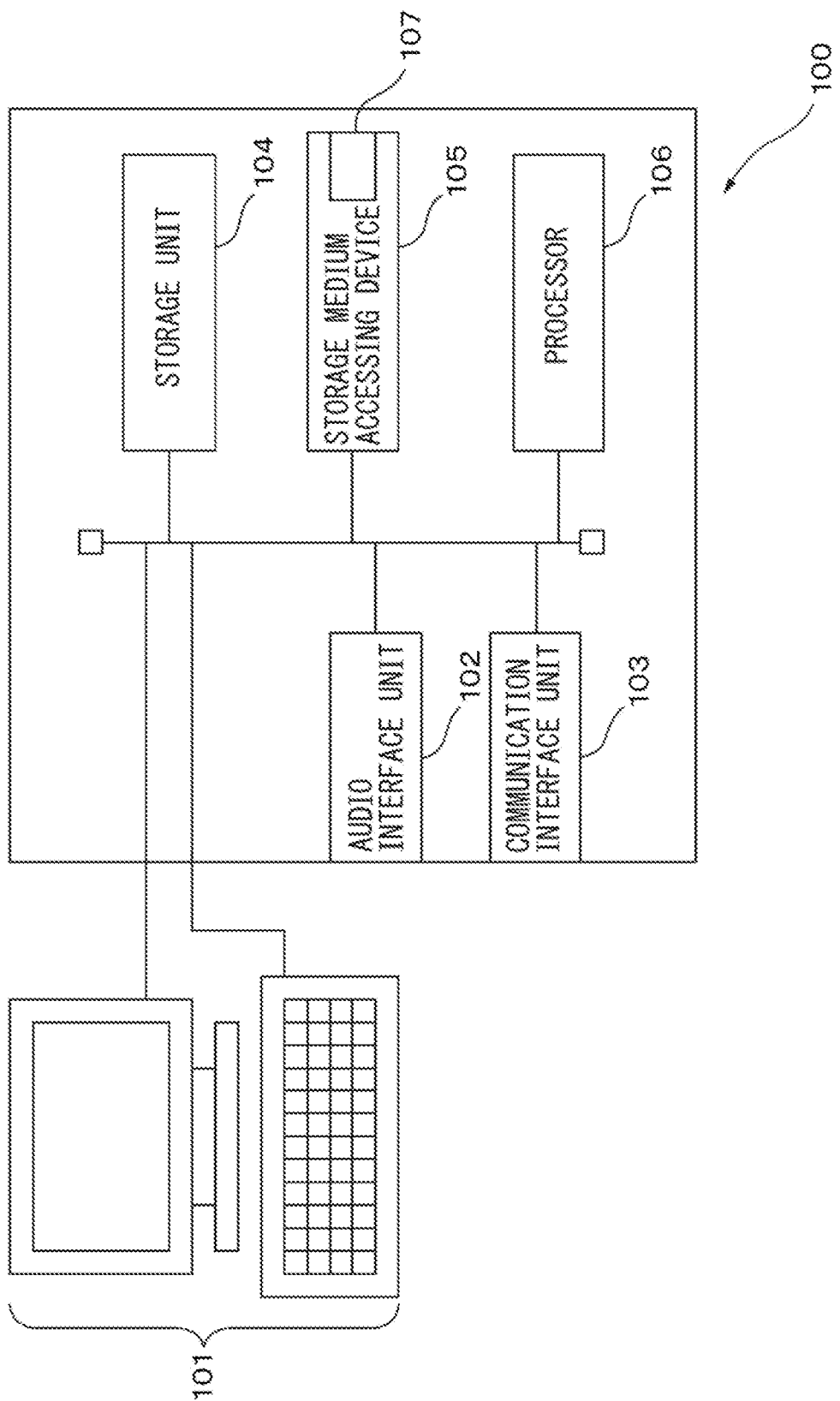
FIG. 8 illustrates a configuration of a computer operating as the audio processing device by an operation of a computer program that implements each function of each unit of the audio processing device according to each embodiment or each modified example thereof.

FIG. 8 illustrates a configuration of the computer operating as the audio processing device by an operation of the computer program that implements each function of each unit of the audio processing device according to each embodiment or each modified example described above.

The computer 100 includes a user interface unit 101, an audio interface unit 102, a communication interface unit 103, a storage unit 104, a storage medium accessing device 105, and a processor 106. The processor 106 is connected via a bus for example to the user interface unit 101, the audio interface unit 102, the communication interface unit 103, the storage unit 104, and the storage medium accessing device 105.

The user interface unit 101 includes an input device such as a keyboard and a mouse, and a display device such as a liquid crystal display. The user interface unit 101 may include a device such as a touch panel display configured by integrating the input device and the display device. The user interface unit 101 outputs, to the processor 106, an operating signal for starting the audio processes in accordance with an operation of a user.

The audio interface unit 102 includes an interface circuit for connecting the computer 100 to the microphone and the speaker (not illustrated). The audio interface unit 102 outputs, to the speaker, the reproduction audio signal that has been corrected so as to suppress the reverb, the reproduction audio signal being received from the processor 6. Alternatively, the audio interface unit 102 transfers, to the processor 106, the input audio signal received from the microphone.

The communication interface unit 106 includes a communication interface and a control circuit for the communication interface to make connection to a communication network following a communication standard such as the Ethernet (registered trademark). The communication interface unit 103 obtains the reproduction audio signal from other devices connected to the communication network, and transfers the obtained reproduction audio signal to the processor 106. The communication interface unit 103 may output the input audio signal received from the processor 106, to other devices via the communication network.

The storage unit 104 includes a random-access semiconductor memory and a read-only semiconductor memory. The storage unit 104 stores the computer program for performing the audio processes and being executed by the processor 106, and stores various data used for the audio processes.

The storage medium accessing device 105 accesses a storage medium such as a magnetic disk, a semiconductor memory card and an optical memory medium. For example, the storage medium accessing device 105 reads the computer program for the audio processes stored in the storage medium 107, and transfers the program to the processor 106, the program being to be executed by the processor 106.

The processor 106 executes the program for the audio processes according to any one of the embodiments and modified examples described above to attenuate the reproduction audio signal to be output via the speaker such that the larger the reverb is, the lager the attenuated amount becomes. The processor 106 outputs the corrected audio signal to the speaker via the audio interface unit 102.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An audio processing device comprising:
  a reverb property estimating unit that estimates a reverb property at each frequency on the basis of a first audio signal and a second audio signal representing sounds of the first audio signal output by an audio output unit and collected by an audio input unit;
  a gain calculating unit that determines an attenuating ratio for a component of the first audio signal at each frequency; and
  a correcting unit that attenuates the first audio signal at the each frequency in accordance with the attenuating ratio, wherein
  the gain calculating unit calculates a rate of a reverb amount indicating magnitude of the reverb property to a deformed amount of the first audio signal caused by a multiplication of the attenuating ratio, and determines the attenuating ratio such that the larger the rate is, the larger the attenuating ratio becomes.

2. The audio processing device according claim 1, wherein the gain calculating unit estimates a first degradation degree in sound quality of the first audio signal caused by the deformed amount, and a second degradation degree in sound quality of the first audio signal caused by the reverb amount, and corrects the attenuating ratio calculated on the basis of the reverb property so as to reduce a sum of the first degradation degree and the second degradation degree.

3. The audio processing device according to claim 2, wherein when the first degradation degree is larger than the second degradation degree, the gain calculating unit reduces the attenuating ratio obtained on the basis of the reverb property, and when the first degradation degree is smaller than the second degradation degree, the gain calculating unit increases the attenuating ratio obtained on the basis of the reverb property.

4. The audio processing device according to claim 1, further comprising a noise spectrum estimating unit that estimates a frequency spectrum of a noise component contained in the second audio signal,
  wherein the gain calculating unit determines the attenuating ratio calculated on the basis of the reverb property, such that the larger the noise component at the frequency is, the more the attenuating ratio at the frequency is reduced.

5. The audio processing device according to claim 1, further comprising a noise spectrum estimating unit that estimates a frequency spectrum of a noise component contained in the second audio signal,
  wherein the gain calculating unit causes the attenuating ratio at the frequency at which a spectrum of the first audio signal is larger than the spectrum of the noise component, to be larger than the attenuating ratio at the frequency at which the spectrum of the first audio signal is equal to or smaller than the spectrum of the noise component.

6. An audio processing method comprising:
  estimating a reverb property at each frequency on the basis of a first audio signal and a second audio signal representing sounds of the first audio signal output by an audio output unit and collected by an audio input unit;
  determining an attenuating ratio for a component of the first audio signal at each frequency; and
  attenuating the first audio signal at the each frequency in accordance with the attenuating ratio, wherein
  the determining the attenuating ratio calculates a rate of a reverb amount indicating magnitude of the reverb property to a deformed amount of the first audio signal caused by a multiplication of the attenuating ratio, and determines the attenuating ratio such that the larger the rate is, the larger the attenuating ratio becomes.

7. The audio processing method according claim 6, wherein the determining an attenuating ratio estimates a first degradation degree in sound quality of the first audio signal caused by the deformed amount, and a second degradation degree in sound quality of the first audio signal caused by the reverb amount, and corrects the attenuating ratio calculated on the basis of the reverb property so as to reduce a sum of the first degradation degree and the second degradation degree.

8. The audio processing method according to claim 7, wherein when the first degradation degree is larger than the second degradation degree, the determining an attenuating ratio reduces the attenuating ratio obtained on the basis of the reverb property, and when the first degradation degree is smaller than the second degradation degree, the determining an attenuating ratio increases the attenuating ratio obtained on the basis of the reverb property.

9. The audio processing method according to claim 6, further comprising estimating a frequency spectrum of a noise component contained in the second audio signal,
wherein the determining an attenuating ratio determines the attenuating ratio calculated on the basis of the reverb property, such that the larger the noise component at the frequency is, the more the attenuating ratio at the frequency is reduced.

10. The audio processing method according to claim 6, further comprising estimating a frequency spectrum of a noise component contained in the second audio signal,
wherein the determining an attenuating ratio causes the attenuating ratio at the frequency at which a spectrum of the first audio signal is larger than the spectrum of the noise component, to be larger than the attenuating ratio at the frequency at which the spectrum of the first audio signal is equal to or smaller than the spectrum of the noise component.

11. A non-transitory computer-readable recording medium recording an audio-processing computer program that causes a computer to execute:
estimating a reverb property at each frequency on the basis of a first audio signal and a second audio signal representing sounds of the first audio signal output by an audio output unit and collected by an audio input unit;
determining an attenuating ratio for a component of the first audio signal at each frequency; and
attenuating the first audio signal at the each frequency in accordance with the attenuating ratio, wherein
the determining the attenuating ratio calculates a rate of a reverb amount indicating magnitude of the reverb property to a deformed amount of the first audio signal caused by a multiplication of the attenuating ratio, and determines the attenuating ratio such that the larger the rate is, the larger the attenuating ratio becomes.

12. An audio processing device comprising:
an audio output unit that reproduces a first audio signal;
an audio input unit that collects sounds of the first audio signal output by the audio output unit, and generates a second audio signal representing the collected sounds; and
a processor adapted to:
estimate a reverb property for each frequency on the basis of the first audio signal and the second audio signal;
determines an attenuating ratio for a component of the first audio signal at each frequency; and
attenuate the first audio signal at the each frequency in accordance with the attenuating ratio, wherein
the determining the attenuating ratio calculates a rate of a reverb amount indicating magnitude of the reverb property to a deformed amount of the first audio signal caused by a multiplication of the attenuating ratio, and determines the attenuating ratio such that the larger the rate is, the larger the attenuating ratio becomes.

* * * * *